United States Patent [19]
Miyazaki et al.

[11] Patent Number: 5,711,551
[45] Date of Patent: Jan. 27, 1998

[54] HOSE COUPLING DEVICE

[75] Inventors: Takeshi Miyazaki; Takumi Narita; Hidekazu Miyazaki, all of Inazawa, Japan

[73] Assignee: Toyoda Gosei Co., Ltd., Inozawa, Japan

[21] Appl. No.: 642,189

[22] Filed: May 6, 1996

Related U.S. Application Data

[62] Division of Ser. No. 96,262, Jul. 26, 1993, Pat. No. 5,542,713.

[30] Foreign Application Priority Data

Jul. 28, 1992 [JP] Japan ................................ 4-201555
Jul. 28, 1992 [JP] Japan ................................ 4-201556

[51] Int. Cl.$^6$ ................................ F16L 3/04
[52] U.S. Cl. ................ 285/136.1; 285/319; 285/906
[58] Field of Search ........................ 285/188, 197, 285/319, 815, 158, 189, 132, 61, 62, 136.1; 248/72, 74.1, 231.8; 29/428, 890.14; 24/339, 543, 545

[56] References Cited

U.S. PATENT DOCUMENTS

| | | |
|---|---|---|
| 1,983,600 | 12/1934 | Christie ................ 285/8 X |
| 2,268,176 | 12/1941 | Woods . |
| 3,050,801 | 8/1962 | Downey . |
| 3,218,093 | 11/1965 | Carlson . |
| 3,872,888 | 3/1975 | Porter . |
| 3,885,742 | 5/1975 | Menzel . |
| 4,052,953 | 10/1977 | Patel . |
| 4,626,006 | 12/1986 | Noguchi et al. . |
| 4,706,999 | 11/1987 | Hynes . |
| 4,834,186 | 5/1989 | Ballard . |
| 5,046,765 | 9/1991 | Usui . |
| 5,054,820 | 10/1991 | Lesquir et al. . |
| 5,171,044 | 12/1992 | Umezawa et al. . |

*Primary Examiner*—Dave W. Arola
*Attorney, Agent, or Firm*—Cushman, Darby & Cushman IP Group of Pillsbury, Madison & Sutro LLP

[57] ABSTRACT

A hose coupling device includes a pipe which has a pipe sleeve portion formed at one end thereof and a hose connecting portion formed at the other end thereof, and fixing means which is set to the pipe in the vicinity of the pipe sleeve portion and is capable of positioning and fixing the pipe sleeve portion in vertical and horizontal directions thereof with respect to a pipe connecting hole formed in a part to which the pipe is attached.

7 Claims, 7 Drawing Sheets

HOSE COUPLING DEVICE

This is a division of application Ser. No. 08/096,262, filed Jul. 26, 1993 now U.S. Pat. No. 5,542,713.

BACKGROUND OF THE INVENTION

1. Field of the Invention

The present invention relates to a hose coupling device and a manufacturing method therefor, and more particularly, to a hose coupling device which is capable of easily connecting a hose by processing a pipe made of steel, copper, aluminum or resin, and to a manufacturing method therefor.

2. Description of Relevant Art

Figure 12A:
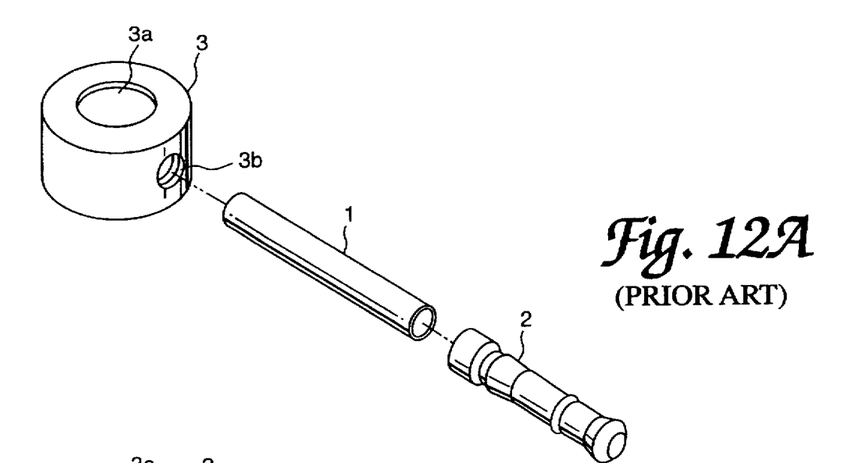
FIGS. 12A and 12B are perspective views illustrating the procedure for assembling a ring union of a conventional hose coupling device.
Figure 12B:
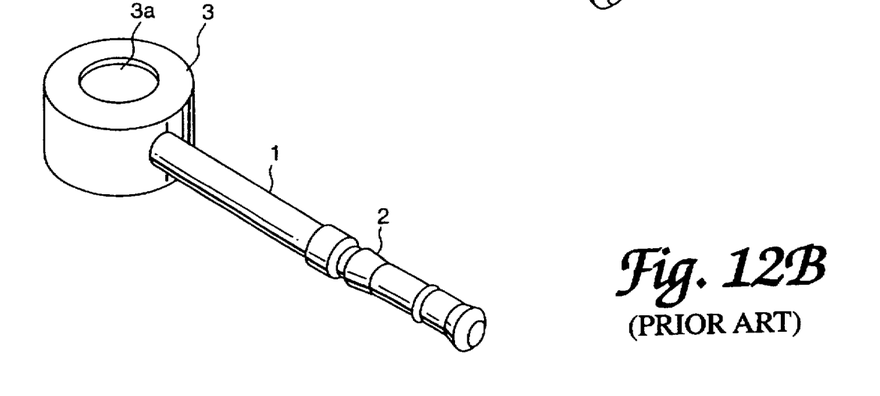

FIGS. 12A and 12B are perspective views of illustrating the procedure for assembling a ring union of a conventional hose coupling device, FIG. 12A showing the ring union in the disassembled state and FIG. 12B showing it in the finished state.

As shown in FIGS. 12A and 12B, what is called "ring union" is used in the conventional hose coupling device. The ring union comprises a steel pipe 1, a nipple 2 which is connected to one end of the pipe 1 and a ring 3 which is connected to the other end of the pipe 1 through a hole 3b formed in the side wall thereof. The nipple 2 and the ring 3 are formed by machining and firmly joined to the pipe 1 by soldering. The ring 3 is formed by boring a central hole 3a therethrough which communicates with the hole 3b in the side wall as well. The ring union is to be connected to a mating part by making use of the ring union 3 and a hose (not shown) is to be connected to the nipple 2.

Figure 13:
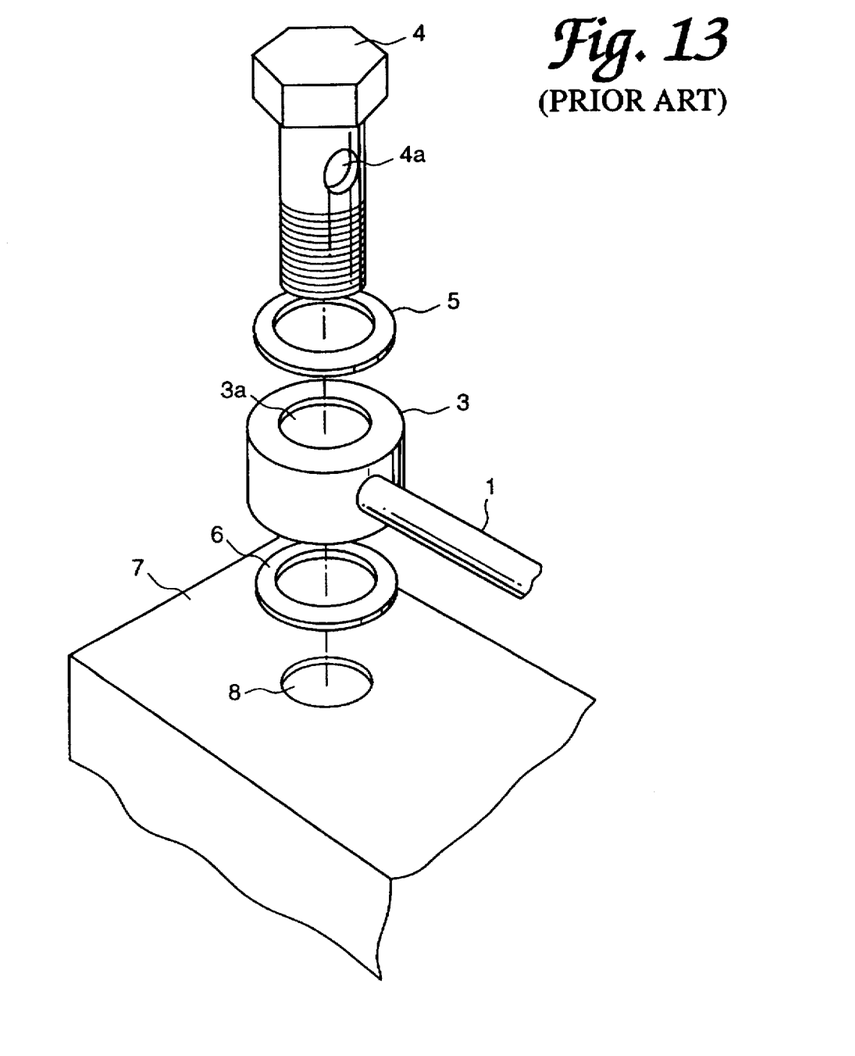
FIG. 13 is an exploded perspective view for illustrating essential portions of the conventional hose coupling device.

Next, the connecting structure of the ring 3 and the mating part will be described. FIG. 13 is a disassembled perspective view for illustrating essential portions of the conventional hose coupling device.

As shown in FIG. 13, a bolt 4 having a hole 4a in its side is inserted in the hole 3a of the ring 3 through a washer 5, and the ring 3 is positioned above a connecting hole 8 of a mating part 7 through a washer 6. Then, by screwing the bolt 4 to the connecting hole 8 of the mating part 7, the ring 3 is firmly fixed to the mating part 7.

Further, since the ring union is allowed to rotate freely insofar as the ring 3 is merely bolted to the mating part 7 by bolt 4, a countermeasure for preventing such rotation is provided.

Figure 14:
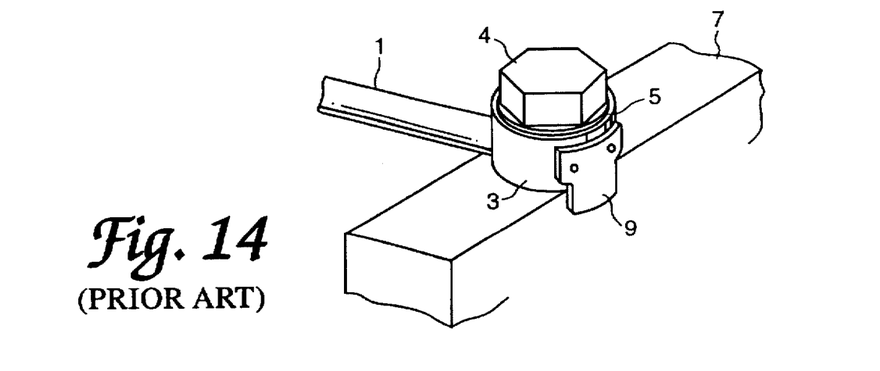
FIG. 14 is a perspective view of the conventional hose coupling device in a positionally fixed state.

FIG. 14 is a perspective view illustrating the conventional hose coupling device in such a fixed state.

As shown in FIG. 14, ring 3 is prevented from rotating by positionally fixing the side wall of the ring 3 to the mating part 7 by means of a stopper plate 9.

However, in the conventional hose coupling device described above, it takes a much time to manufacture the ring union. Namely, ring 3 is formed by machining a bar material. It is also necessary to join the ring 3 and the pipe 1 together by soldering or the like. Further, in order to connect the ring union to the mating part 7, many parts, including bolt 4, are required. Moreover, the cost of the device is increased since the unit price of bolt 4 is higher than that of the conventional solid bolts. In addition, it is necessary to prevent the ring 3 from rotating by fixing the ring 3 to the mating part 7 using the stopper plate 9 or the like.

SUMMARY OF THE INVENTION

An object of the present invention is to provide a hose coupling device which can be formed with fewer component parts, which can be manufactured easily, and in which the positioning of those parts and fixing them against relative movement is easily realized.

To achieve this end, a hose coupling apparatus according to the present invention comprises a pipe which serves to connect a hose and which is formed with a pipe sleeve portion at one end thereof, and fixing means which is provided at a predetermined distance from the pipe sleeve portion of the pipe and is capable of positioning and fixing the pipe sleeve portion in vertical and horizontal directions with respect to a pipe connecting hole of a mating part to be attached thereto.

In the hose coupling device according to the present invention, the pipe sleeve portion is positioned and fixed in the vertical and horizontal directions with respect to the mating part to be attached thereto by using a bent portion having a predetermined configuration, a fastening clip and the like as the fixing means provided at a predetermined distance from the pipe sleeve portion of the pipe. Therefore, it is possible to easily position the pipe and fix it against the movement, with fewer parts and at reduced cost.

DETAILED DESCRIPTION OF THE PREFERRED EMBODIMENTS

Preferred embodiments of the present invention are described hereinafter.

Figure 1:
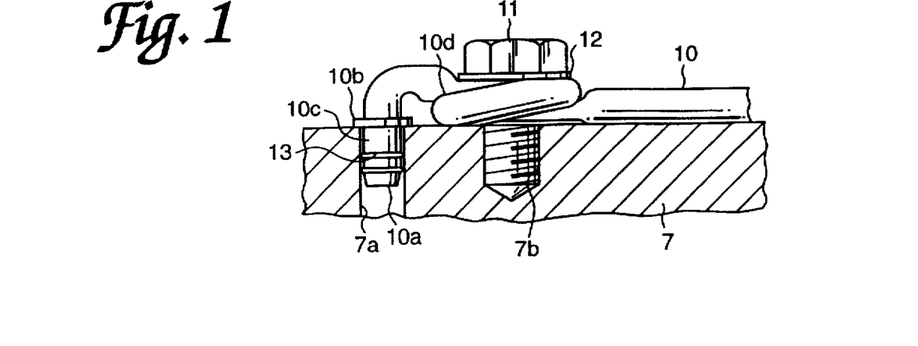
FIG. 1 is a side view of a hose coupling device according to a first embodiment of the present invention.

FIG. 1 is a side view illustrating a hose coupling device according to a first embodiment of the present invention. In this drawing, the same reference numerals and characters denote the same or corresponding component parts as those in FIGS. 13–14.

As shown in FIG. 1, a pipe 10 is formed with a pipe sleeve portion 10c at one end thereof. This pipe sleeve portion 10c comprises a tip end 10a and a flange 10b, typically formed by means of drawing. The pipe 10 is disposed substantially at right angles relative to the pipe sleeve portion 10c, and is further subjected to bending at a predetermined distance from the pipe sleeve portion 10c so as to form an annular coiled portion 10d. The pipe sleeve portion 10c of the pipe 10 is inserted in a connecting hole 7a of a mating part 7 for mounting the pipe thereon. A bolt 11 is inserted in the loop of the coiled portion 10d of the pipe 10 through a washer 12 and screwed to a fixing hole 7b of the mating part 7. In order to insure sealing between the pipe sleeve portion 10c and the connecting hole 7a, an O-ring 13 is fitted on the pipe sleeve portion 10c.

The procedure for processing the pipe 10 of the hose coupling device according to this embodiment will now be described. FIGS. 2A to 3C are perspective views for illustrating the procedure for processing the pipe of the hose coupling device according to the first embodiment of the present invention.

Figure 2A:
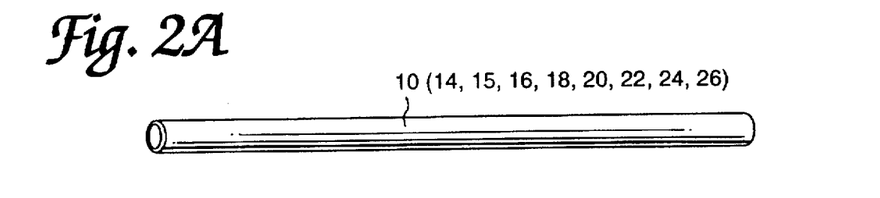
FIGS. 2A to 2D are perspective views for illustrating the procedure for processing a pipe of the hose coupling device according to each embodiment of the present invention.
Figure 2B:
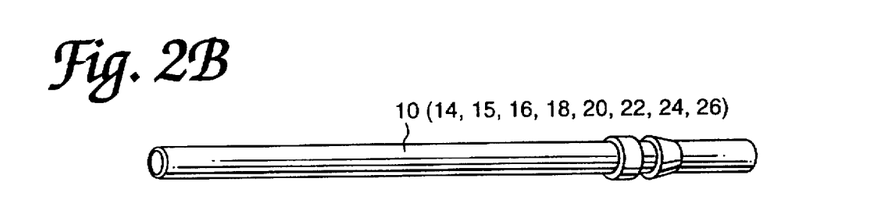
Figure 2C:
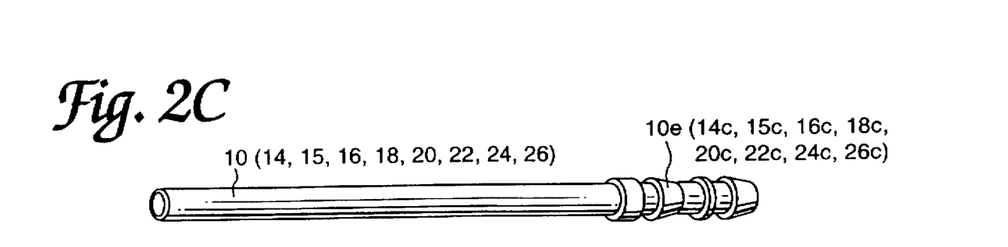
Figure 2D:
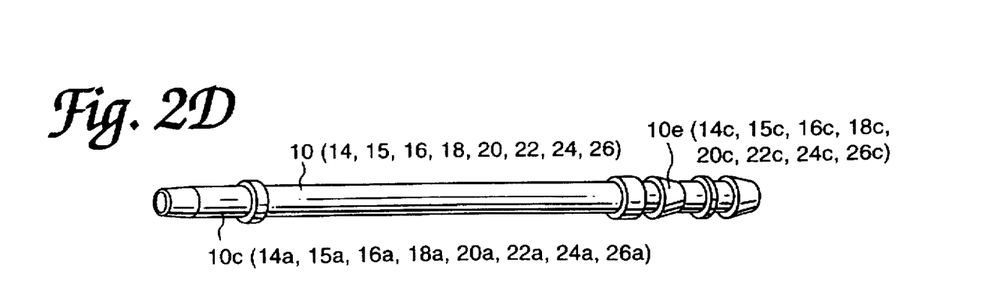
Figure 3A:
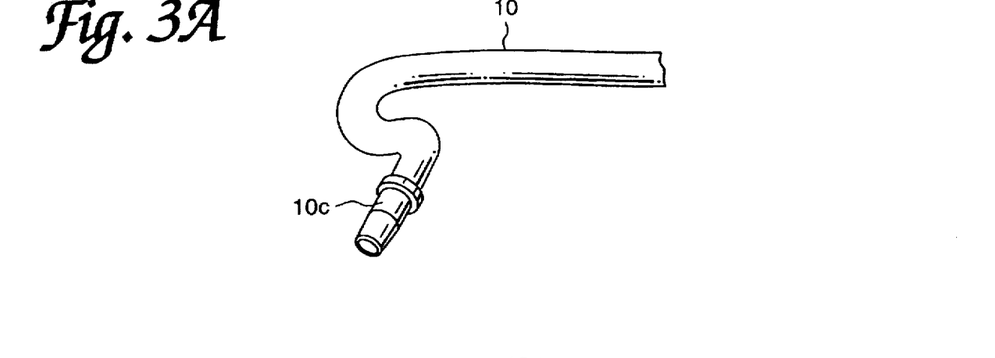
FIGS. 3A to 3C are perspective views for illustrating the procedure for processing the pipe of the hose coupling device according to the first embodiment of the present invention.
Figure 3B:
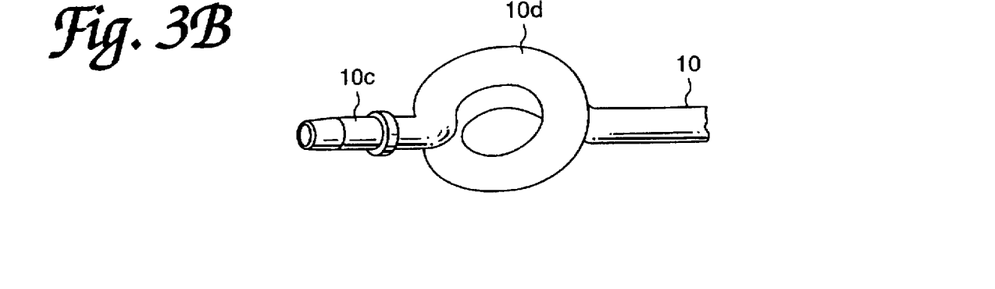
Figure 3C:
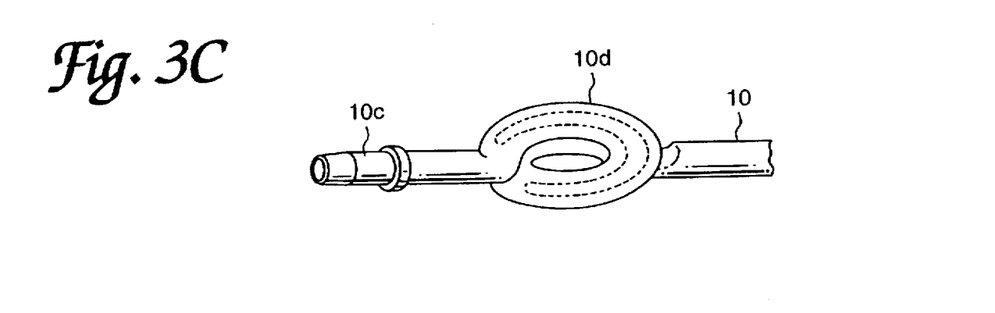

The processing of the pipe 10 is performed successively according to the order of FIGS. 2A to 2D. As shown in FIGS. 2C and 2D, the pipe 10 is formed with a connecting portion 10e to which a hose is to be connected at one end thereof and with the pipe sleeve portion 10c at the other end thereof. In the pipe 10 having the connecting portion 10e and the pipe sleeve portion 10c which are formed in this way, the annular coiled portion 10d is formed at a determined distance from the pipe sleeve portion 10c according to the procedure illustrated in FIGS. 3A to 3B. The upper and lower surfaces of the coiled portion 10d are flattened as shown in FIG. 3C. Subsequently, the pipe 10 is bent substantially at right angles with respect to the pipe sleeve portion 10c (not shown).

In order to fix such processed pipe 10 to the mating part 7, it is sufficient only to insert the pipe sleeve portion 10c into the connecting hole 7a of the mating part 7 through the O-ring 13, insert the bolt 11 into the loop of the coiled portion 10d through the washer 12, and then screw the bolt 11 into the fixing hole 7b of the mating part 7. Since the positional relation between the pipe sleeve portion 10c and the coiled portion 10d of the pipe 10 is equivalent to that between the connecting hole 7a and the fixing hole 7b of the mating part 7, the pipe sleeve portion 10c can be assuredly connected to the connecting hole 7a by screwing the bolt 11 to the fixing hole 7b when the pipe sleeve portion 10c of the pipe 10 is inserted in the connecting hole 7a of the mating part 7. Accordingly, it is possible to prevent the pipe sleeve portion 10c from moving in the vertical and horizontal directions by positionally fixing it with a conventional bolt 11. Namely, vertical movement of the pipe sleeve portion 10c is restrained by the bolt 11 and the washer 12, while horizontal movement thereof is restrained by screwing the bolt 11 to the fixing hole 7b and inserting the pipe sleeve portion 10c in the connecting hole 7a. For this reason, special parts, such as a stopper plate used conventionally for stopping the rotation, become unnecessary. Incidentally, a predetermined hose (not shown) is to be connected to the connecting portion 10e of the pipe 10.

As described above, the hose coupling device according to this first embodiment provides a pipe 10, which is formed with the pipe sleeve portion 10c at one end thereof and with the hose connecting portion 10e at the other end thereof. Pipe 10 has an annular coiled or looped portion 10d which is formed by bending at a determined distance from the pipe sleeve portion 10c of the pipe 10. A bolt 11 is inserted in the coiled portion 10d through a washer 12 for positioning and fixing the pipe sleeve portion 10c in three orthogonal directions, i.e., the vertical and two horizontal directions in FIG. 1, with respect to the connecting hole 7a of the mating part 7.

Thus, the conventional ring formed by machining a bar material (discussed above) can be replaced by the bending of the pipe 10, so that not only any joining process such as soldering becomes unnecessary but also the bolt formed with a hole therein can be replaced by a conventional bolt 11. Moreover, it is possible to perform easily the positioning and fixing against movement without using a stopper plate or the like. For this reason, since the construction of the hose coupling device is changed from a conventional and complicated form to a simpler one, the number of the component parts is decreased, resulting in simplified manufacturing and attaching operations and lower device cost.

Incidentally, in order to perform the positioning and fixing thereof more effectively by using the bolt 11 and the washer 12, it is preferable that the coiled portion 10d and the fixing hole 7b are located not too distantly from the pipe sleeve portion 10c.

The O-ring 13 is used as a seal of the pipe sleeve portion 10c in the present embodiment. However, it is also possible to seal the pipe sleeve portion 10c by disposing a stationary washer on the lower surface of the flange 10b in place of the O-ring 13.

Figure 4:
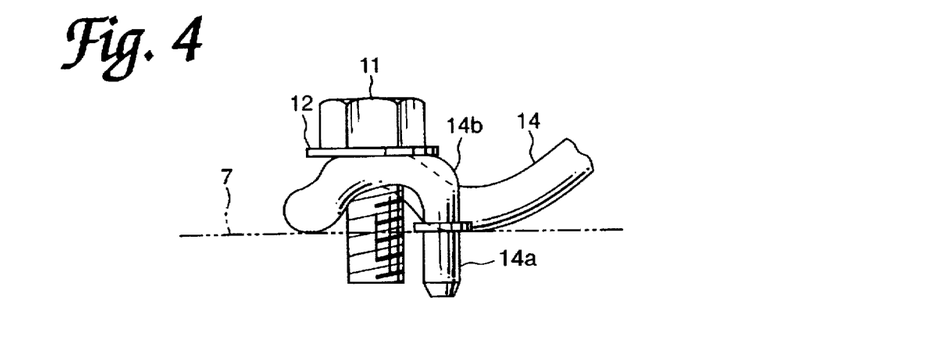
FIG. 4 is a side view of a hose coupling device according to a second embodiment of the present invention.

FIG. 4 is a side view illustrating a hose coupling device according to a second embodiment of the present invention. In this drawing, the same reference numerals and characters denote the same or corresponding component parts as those of the prior art and the embodiment described above.

As shown in FIG. 4, a pipe 14 has a pipe sleeve portion 14a formed at one end thereof. The pipe sleeve portion 14a has the same construction as that of the first embodiment shown in FIGS. 2A to 2D. The pipe 14 is bent substantially at right angles with respect to the pipe sleeve portion 14a, and is further formed with a vertically corrugated bent portion 14b at a predetermined distance from the pipe sleeve portion 14a. The pipe sleeve portion 14a of the pipe 14 is inserted in a connecting hole (not shown) of the mating part 7. Bolt 11 is inserted in the bent portion 14b of the pipe 14 through a washer 12 and is screwed to a fixing hole (not shown) of the mating part 7. Moreover, the pipe 14, which is formed with the pipe sleeve portion 14a at one end thereof, is formed at the other end thereof with a hose connecting portion 14c (see FIGS. 2C and 2D). In order to insure sealing between the pipe sleeve portion 14a and the connecting hole, an O-ring (not shown) is fitted on the pipe sleeve portion 14a.

The procedure for processing the pipe 14 of the hose coupling device according to this embodiment is substantially the same as that of the aforesaid first embodiment, and therefore, the duplicate explanation thereof will be omitted in this embodiment.

Further, the operation of fixing the pipe 14 to the mating part 7 is substantially the same as that of the aforesaid first embodiment as well. It is sufficient only to insert the pipe sleeve portion 14a of the pipe 14 into the connecting hole of the mating part through the O-ring, insert bolt 11 in the center of the bent portion 14b through the washer 12, and screw the bolt 11 to the fixing hole of the mating part 7. Also in this embodiment, since the positional relation between the pipe sleeve portion 14a and the bent portion 14b of the pipe 14 is equivalent to that between the connecting hole and the fixing hole of the mating part 7, the pipe sleeve portion 14a can be assuredly connected to the connecting hole by screwing the bolt 11 into the fixing hole of the mating part 7 when the pipe sleeve portion 14a of the pipe 14 is inserted in the connecting hole of the mating part 7. Accordingly, any complicated positioning operation becomes unnecessary and it is thus possible to control the vertical and horizontal movements of the pipe sleeve portion 14a, using the conventional bolt 11. In consequence, any special parts, such as the stopper plate 9 of the prior art, become unnecessary.

As described above, the hose coupling device according to this second embodiment provides the pipe 14, which has the pipe sleeve portion 14a provided at one end thereof and the hose connecting portion 14c provided at the other end thereof, with the vertically corrugated bent portion 14b and the bolt 11 and washer 12 (fixing means) in which the bolt 11 is inserted in the bent portion 14b through the washer 12 for positioning and fixing the pipe sleeve portion 14a in the vertical and horizontal directions with respect to the connecting hole of the mating part 7.

In the hose coupling device according to this embodiment, the pipe sleeve portion 14a is positioned and fixed with respect to the connecting hole of the mating part 7 by means of the bolt 11 and the washer 12 inserted through the vertically corrugated bent portion 14b formed at a predetermined distance from the pipe sleeve portion 14a. Hence, in this embodiment, the coiled portion 10d of the aforesaid first embodiment is changed to the bent portion 14b.

Accordingly, in this embodiment the construction of the hose coupling device is changed from a conventional complicated form to a simpler one to decrease the number of the component parts. It therefore becomes easy to manufacture the device and the cost of the device is reduced. Further, since it is possible to easily perform positioning and fixing against movement thereof without using the stopper plate or the like, the attaching operation is simplified and the workability is improved.

Incidentally, an L-shaped metal fitting (not shown) may be used in place of the washer 12 for the purpose of preventing the pipe from being crushed.

FIGS. 5A to 5D are perspective views for illustrating the procedure for processing a pipe of a hose coupling device according to a third embodiment of the present invention. FIGS. 2A to 2D are common to the embodiments described above. In the FIGS. 5A to 5D, the same reference numerals and characters denote the same or corresponding component parts as those of the prior art and the embodiments described before.

Figure 5A:
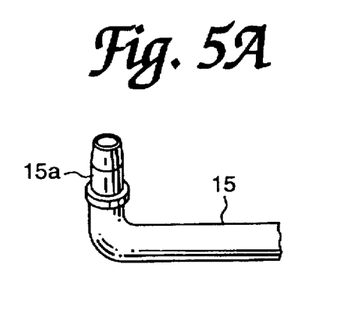
FIGS. 5A to 5D are perspective views for illustrating the procedure for processing a pipe of a hose coupling device according to a third embodiment of the present invention.
Figure 5B:
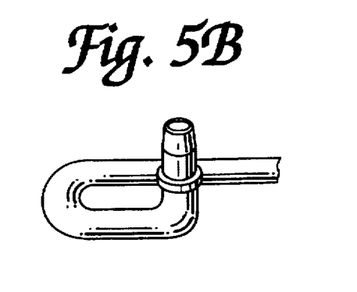
Figure 5C:
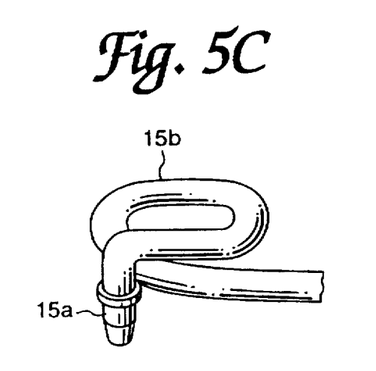
Figure 5D:
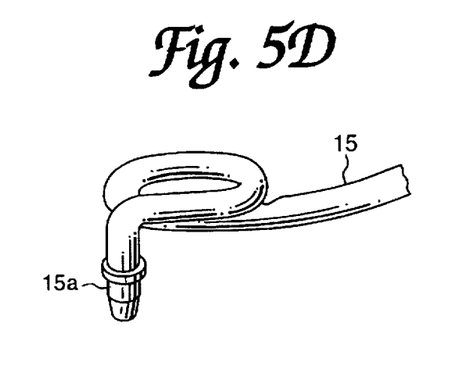

A pipe 15 which is formed with a connecting portion 15c and a pipe sleeve portion 15a in the manner shown in FIGS. 2A to 2D is bent according to the procedure shown in FIGS. 5A to 5D. First, the pipe 15 is bent substantially at right angles with the pipe sleeve portion 15a left unbent as shown in FIG. 5A. Then, as shown in FIGS. 5B and 5C, the pipe 15 is bent at a predetermined distance from the pipe sleeve portion 15a so as to form a vertically overlapped folded portion 15b. Subsequently, the upper and lower surfaces of the folded portion 15b are flattened as shown in FIG. 5D.

The operation of fixing the thus-processed pipe 15 to the mating part is substantially the same as that of the aforesaid first and second embodiments, and therefore, description thereof will be omitted in this embodiment. Since the positional relation between the pipe sleeve portion 15a and the folded portion 15b of the pipe 15 in this embodiment is equivalent to that between the connecting hole and the fixing hole of the mating part (not shown), the pipe sleeve portion 15a can be assuredly connected to the connecting hole by screwing a bolt or the like to the fixing hole of the mating part when the pipe sleeve portion 15a of the pipe 15 is inserted in the connecting hole of the mating part. Accordingly, it is possible to prevent the pipe sleeve portion 15a from moving in the vertical and horizontal directions using bolt or the like. Thus, a conventional special parts such as the stopper plate 9 of the prior art become unnecessary.

As described above, the hose coupling device according to this embodiment consists of the pipe 15 which is provided with the pipe sleeve portion 15a at one end thereof and with the hose connecting portion 15c at the other end thereof, the vertically overlapped folded portion 15b and the fixing means such as the bolt which is inserted in the folded portion 15b and is capable of positioning and fixing the pipe sleeve portion 15a in the vertical and horizontal directions thereof with respect to the connecting hole of the mating part.

In this embodiment, since the construction of the hose coupling device is changed from a conventional complicated form to a simple one, and since it is possible to easily perform the positioning and fixing against movement without using a stopper plate or the like, the number of the component parts is decreased, the manufacturing and attaching operations are simplified, and the cost of the device is reduced.

Figure 6:
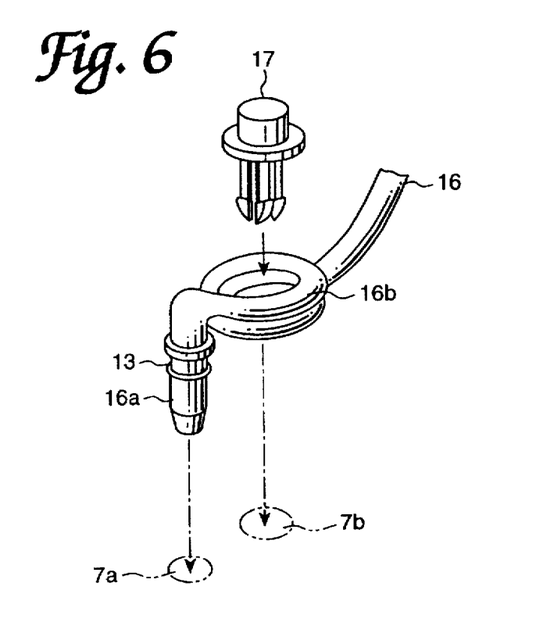
FIG. 6 is a exploded perspective view of a hose coupling device according to a fourth embodiment of the present invention.

FIG. 6 is a exploded perspective view of a hose coupling device according to a fourth embodiment of the present invention. FIGS. 2A to 2D are common to the embodiments described above. In the drawings, the same reference numerals and characters denote the same or corresponding component parts as those of the prior art and the embodiments described above.

As shown in FIG. 6, a pipe 16 is provided at one end thereof with a pipe sleeve portion 16a. The pipe sleeve portion 16a has the same construction as that of the above-described embodiments. The pipe 16 is bent substantially at right angles with the pipe sleeve portion 16a, and is further formed with an annular double coiled portion 16b at a predetermined distance from the pipe sleeve portion 16a. The pipe sleeve portion 16a of the pipe 16 is inserted in the connecting hole 7a of the mating part, and a clip 17 is inserted through the coiled portion 16b of the pipe 16 to be engaged with the fixing hole 7b of the mating part. Moreover, the pipe 16, which is provided with pipe sleeve portion 16a at one end, is provided with a hose connecting portion 16c at the other end thereof (see FIGS. 2A to 2D). In order to insure sealing between the pipe sleeve portion 16a and the connecting hole 7a, an O-ring 13 is fitted on the pipe sleeve portion 16a.

The procedure for processing the pipe 16 of the hose coupling device according to this embodiment and the operation of fixing the pipe 16 to the mating part are substantially the same as those of the above-described embodiments, and therefore, only the point of difference between these procedures will be described briefly. In this embodiment, it is possible to fix the pipe 16 to the mating part by inserting the pipe sleeve portion 16a into the connecting hole 7a and through the O-ring 13, inserting the clip 17 into the loop of the coiled portion 16b and engaging the clip 17 with the fixing hole 7b. Since the positional relation between the pipe sleeve portion 16a and the coiled portion 16b of the pipe 16 is equivalent to that between the connecting hole 7a and the fixing hole 7b of the mating part, the pipe sleeve portion 16a can be assuredly connected to the connecting hole 7a by engaging the clip 17 with the fixing hole 7b when the pipe sleeve portion 16a of the pipe 16 is inserted in the connecting hole 7a of the mating part. Accordingly, complicated positioning operations become unnecessary and it is possible to prevent the pipe sleeve portion 16a from moving in the vertical and horizontal directions using the clip 17. Thus, special parts such as the stopper plate 9 of the prior art are unnecessary. While the coiled portion 16b of the pipe 16 is formed in the shape of a double loop in the present embodiment, it may be formed in the shape of a single loop like the first embodiment. In such case, however, it is necessary to make the length of the clip 17 a little shorter compared with the case of the double loop one.

As described above, the hose coupling device according to this embodiment provides the pipe 16, which is provided with the pipe sleeve portion 16a at one end thereof and with the hose connecting portion 16c at the other end thereof, with the coiled portion 16b which is formed in the shape of a double loop at a predetermined distance from the pipe sleeve portion 16a of the pipe 16, and with the clip 17 which is to be inserted in the coiled portion 16a and is capable of positioning and fixing the pipe sleeve portion 16a in the vertical and horizontal directions with respect to the connecting hole 7a of the mating part.

Since the construction of the hose coupling device in the present embodiment is simplified, and since it is possible to easily perform positioning and fixing of the pipe against the movement thereof without using a stopper plate or the like, the number of the component parts is decreased, the manufacturing and attaching operations thereof are simplified, and the cost of the device is reduced.

Particularly in this embodiment, since a clip 17 is employed, the attachment of the pipe can be performed more quickly compared with using the bolt.

Figure 7:
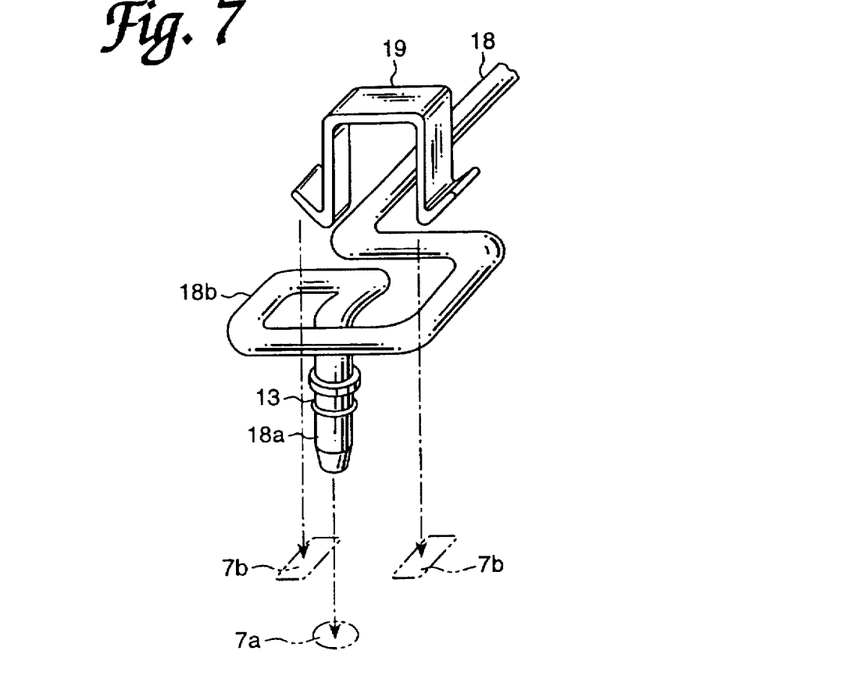
FIG. 7 is a exploded perspective view of a hose coupling device according to a fifth embodiment of the present invention.

FIG. 7 is a exploded perspective view illustrating a hose coupling device according to a fifth embodiment of the present invention. FIGS. 2A to 2D are common to the embodiments described above. In the drawings, the same reference numerals and characters denote the same or corresponding component parts as those of the prior art and the embodiments described above.

As shown in FIG. 7, a pipe 18 has a pipe sleeve portion 18a provided at one end thereof. The pipe sleeve portion 18a has the same construction as that of the embodiments described above. The pipe 18 is bent substantially at right angles with respect to the pipe sleeve portion 18a, and is further formed with an effectively spiral roundabout portion 18b at a predetermined distance from the pipe sleeve portion 18a. The pipe sleeve portion 18a of the pipe 18 is inserted in the connecting hole 7a of the mating part, and a forked clip 19 is inserted through the roundabout portion 18b of the pipe 18 to be engaged with the fixing holes 7b of the mating part. Moreover, the pipe 18 which is formed with the pipe sleeve portion 18a at one end thereof has a hose connecting portion 18c (not shown in FIG. 7) provided at the other end thereof (see FIGS. 2A to 2D). In order to insure sealing between the pipe sleeve portion 18a and the connecting hole 7a, an O-ring 13 is mounted on the pipe sleeve portion 18a.

The procedure for processing the pipe 18 of the hose coupling device according to this embodiment and the operation of fixing the pipe 18 to the mating part are substantially the same as those of the embodiments described above, and therefore, only the point of difference between those procedures will be described briefly. In the present embodiment, it is possible to fix the pipe 18 to the mating part only by inserting the pipe sleeve portion 18a of the pipe 18 into the connecting hole 7a of the mating part through the O-ring 13, inserting the forked clip 19 through the spiral roundabout portion 18b of the pipe 18, and engaging the forked clip 19 with the fixing holes 7b of the mating part. Also, since the positional relation between the pipe sleeve portion 18a and the roundabout portion 18b of the pipe 18 corresponds to that between the connecting hole 7a and the fixing holes 7b of the mating part, the pipe sleeve portion 18a can be assuredly connected to the connecting hole 7a by engaging the forked clip 19 with the fixing holes 7b of the mating part when the pipe sleeve portion 18a of the pipe 18 is inserted in the connecting hole 7a of the mating part. Accordingly, complicated positioning operations are unnecessary and it is possible to prevent the pipe sleeve portion 18a from moving in the vertical and horizontal directions by the engagement therebetween with the forked clip 19. For this reason, special parts such as the stopper plate 9 of the prior art become unnecessary.

As described above, the hose coupling device according to the present embodiment consists of a pipe 18 which is provided with the pipe sleeve portion 18a at one end thereof and with the hose connecting portion 18c at the other end thereof, a roundabout portion 18b which is formed by bending a portion of pipe 18 into a generally spiral shape at a predetermined distance from the pipe sleeve portion 18a of the pipe 18, and a forked clip 19 which is inserted in the roundabout portion 18b in order to position and fix the pipe sleeve portion 18a in the vertical and horizontal directions with respect to the connecting hole 7a of the mating part.

Accordingly, the number of the component parts is decreased, the manufacturing and attaching operations are simplified and the cost of the device is reduced like the embodiments previously described above. Further, since the forked clip 19 is employed, the attaching operation thereof can be performed even more quickly as compared with using a bolt according to the fourth embodiment described before.

In order to insure attaching stability when the pipe 18 is fixed by the forked clip 19, it is preferred that a portion of the pipe 18 with which the mating part is brought into contact be flattened.

As described above, according to the hose coupling device of the present invention, a pipe which has a pipe sleeve portion provided at one end and a hose connecting portion provided at the other end thereof is formed by bending with the bent portion having a predetermined configuration at a predetermined distance from the pipe sleeve portion, so that the pipe sleeve portion is positioned and fixed in the vertical and horizontal directions with respect to a connecting hole of a mating part by means of a fixing part (e.g., a clip or a bolt) engaged through the bent portion of the pipe. Therefore, the total number of the component parts is decreased, thereby reducing manufacturing expenses thereof. It is therefore possible to easily position and fix the pipe against movement thereof. The manufacturing and attaching operations are thus simplified and the overall cost of the device is reduced.

Figure 8:
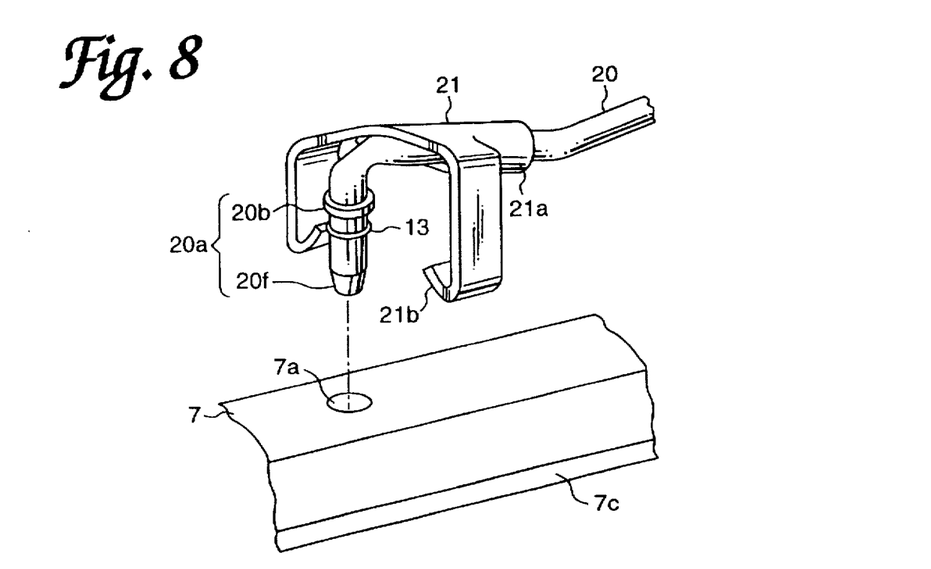
FIG. 8 is a perspective view of a hose coupling device according to a sixth embodiment of the present invention.

FIG. 8 is a perspective view of a hose coupling device according to a sixth embodiment of the present invention. In FIG. 8, the same reference numerals and characters denote the same or corresponding component parts as or to those of the prior art mentioned before.

As shown in FIG. 8, a pipe 20 has a pipe sleeve portion 20a provided at one end thereof. The pipe sleeve portion 20a comprises a tip end 20f and a flange 20b provided by drawing. The pipe 20 is bent substantially at right angles with the pipe sleeve portion 20a. A fastening clip 21 of a specified form is fastened thereto at a predetermined distance from the pipe sleeve portion 20a. In particular, a fastening portion 21a of the fastening clip 21 is fixed by tightening it to the pipe 20 so that the fastening clip 21 is effectively fastened to the pipe 20. Further, a pawl 21b is formed at each of the forked tip ends of the fastening clip 21. Thus, according to the present invention, the pipe sleeve portion 20a of the pipe 20 is inserted in the connecting hole 7a of the mating part 7 and the pawls 21b of the fastening clip 21 are engaged with engaging portions 7c of the mating part 7. Furthermore, in order to insure good sealing performance of the pipe sleeve portion 20a and the connecting hole 7a, a O-ring 13 is mounted on the pipe sleeve portion 20c.

In order to fix the pipe 20 (processed in the manner shown in FIGS. 2A to 2D) to the mating part 7, it is sufficient only to fasten the fastening portion 21a of the fastening clip 21 to the pipe 20, insert the pipe sleeve portion 20a with the O-ring 13 into the connecting hole 7a of the mating part 7, and engage the pawls 21b of the fastening clip 21 with the engaging portions 7c of the mating part 7. The pipe sleeve portion 20a can be assuredly connected to the connecting hole 7a by engaging the pawls 21b of the fastening clip 21 with the engaging portions 7c of the mating part 7 when the pipe sleeve portion 20a of the pipe 20 is inserted in the connecting hole 7a of the mating part 7. Accordingly, a complicated positioning operation is unnecessary. It is also possible to prevent the pipe sleeve portion 20a from moving in the vertical and horizontal directions. More specifically, the vertical movement of the pipe sleeve portion 20a is controlled by the fastening clip 21, while the horizontal movement of the pipe sleeve portion 20a is controlled by the engagement between the fastening clip 21 and the engaging portions 7c, and the insertion of the pipe sleeve portion 20a in the connecting hole 7a. For this reason, special parts such as the stopper plate 9 of the prior art are unnecessary. Incidentally, a predetermined hose (not shown) is to be connected to the connecting portion 20c of the pipe 20 (see FIGS. 2C and 2D).

As described above, the hose coupling device according to the sixth embodiment includes a pipe 20 which is provided with the pipe sleeve portion 20a at one end and with a hose connecting portion 20c at the other end thereof. It also includes a fastening clip 21 which is fastened to the pipe 20 in the vicinity of the pipe sleeve portion 20a through the fastening portion 21a for positioning and fixing the pipe sleeve portion 20a in the vertical and horizontal directions with respect to the connecting hole 7a of the mating part 7 by engaging the pawls 21b with the engaging portions 7c of the mating part 7.

Accordingly, the conventional ring, formed by machining a bar material, can be replaced by the bending of the pipe 20, so that complicated joining processes such as soldering become unnecessary. In addition, a bolt with a hole therethrough becomes unnecessary. Thus, it is possible to fix the pipe 20 to the mating part 7 much more easily. For this reason, since the construction of the hose coupling device is greatly simplified, the number of the component parts is decreased, so that manufacturing and attaching operations are likewise simplified and the cost of the device is reduced.

In order to perform the positioning and fixing most effectively using the fastening clip 21, it is preferred that the fastening clip 21 is fastened to the pipe 20 in the vicinity of the pipe sleeve portion 20a.

Figure 9:
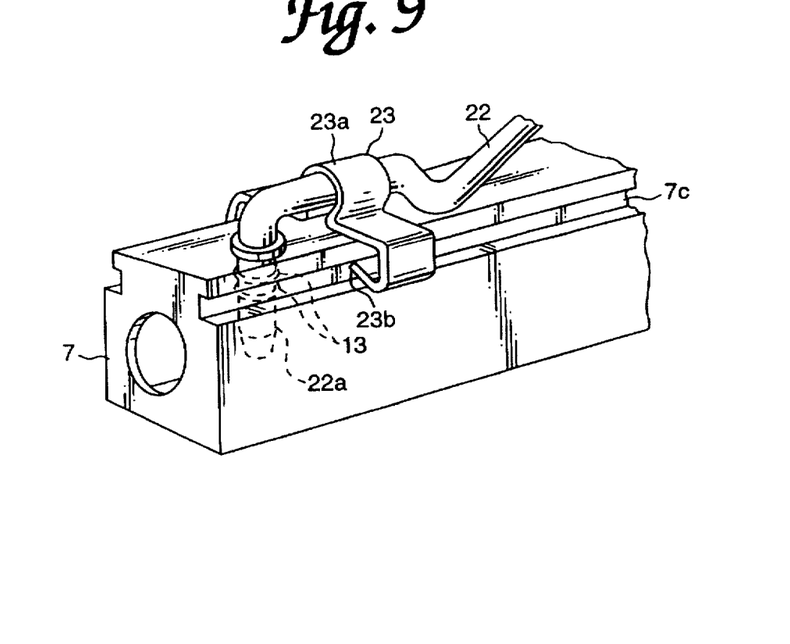
FIG. 9 is a perspective view of a hose coupling device according to a seventh embodiment of the present invention.

FIG. 9 is a perspective view illustrating a hose coupling device according to a seventh embodiment of the present invention. FIGS. 2A to 2D are common to this and the embodiments described above. In the drawings, the same reference numerals and characters denote the same or corresponding component parts as those of the prior art and the embodiments described above.

As shown in FIG. 9, a pipe 22 is provided with a pipe sleeve portion 22a at one end thereof. The pipe sleeve portion 22a has the same general construction as that of the sixth embodiment described above. The pipe 22 is bent substantially at right angles with respect to the pipe sleeve portion 22a, and a fastening clip 23 is fastened thereto by a fastening portion 23a at a predetermined distance from the pipe sleeve portion 22a. The pipe sleeve portion 22a of the pipe 22 is inserted in a connecting hole (not shown) of the mating part 7. Pawls 23b of the fastening clip 23 are engaged with channel-shaped engaging portions 7c of the mating part 7. Further, the pipe 22 is provided with a hose connecting portion 22c at the other end thereof (see FIGS. 2A to 2D). In order to insure good sealing between the pipe sleeve portion 22a and the connecting hole, two O-rings 13 are fitted on the pipe sleeve portion 22a.

Since the procedure for manufacturing the pipe 22 of the hose coupling device according to this embodiment is the same as that of the aforesaid sixth embodiment, an explanation thereof will be omitted in this embodiment.

Further, the operation of fixing the pipe 22 to the mating part 7 is substantially the same as the aforesaid sixth embodiment as well. Namely, in this present embodiment, the pipe sleeve portion 22a can be assuredly connected to the connecting hole by engaging the pawls 23b of the fastening clip 23 with the engaging portions 7c of the mating part when the pipe sleeve portion 22a of the pipe 22 is inserted in the connecting hole of the mating part 7. Accordingly, a complicated positioning operation is unnecessary. Further, it is possible to control the vertical and horizontal movements of the pipe sleeve portion 22a. For this reason, special parts such as the stopper plate of the prior art are unnecessary.

As described above, the hose coupling device according to the present embodiment consists of a pipe 22 which is provided with a pipe sleeve portion 22a at one end and with the hose connecting portion 22c at the other end thereof, and a fastening clip 23 which is set to the pipe 22 through a fastening portion 23a in the vicinity of the pipe sleeve portion 22a. The fastening clip 23 is capable of positioning and fixing the pipe sleeve portion 22a in the vertical and horizontal directions with respect to the connecting hole of the mating part by engaging the pawls 23b with the engaging portions 7c of the mating part.

Accordingly, in this seventh embodiment, the construction of the hose coupling device is simplified to decrease the number of the component parts, so that it is relatively easy to manufacture the device and so that the cost of the device is reduced. Further, since it is possible to easily position and fix the device against movement without using a stopper plate or the like, the attaching operation is simplified and workability is improved.

Figure 10:
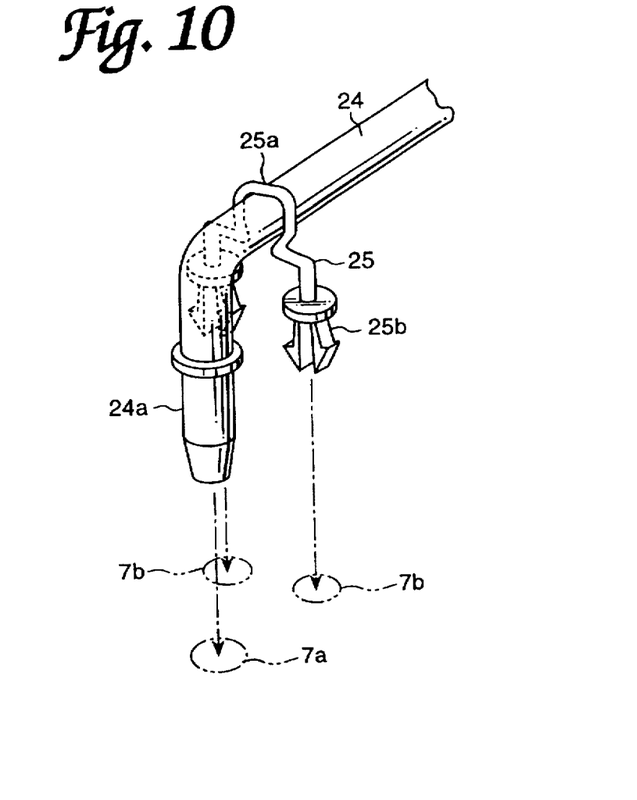
FIG. 10 is a perspective view of a hose coupling device according to an eighth embodiment of the present invention.

FIG. 10 is a perspective view illustrating a hose coupling device according to an eighth embodiment of the present invention. FIGS. 2A to 2D are common to the embodiments described above. In the drawings, the same reference numerals and characters denote the same or corresponding component parts as those of the prior art and the embodiments described above.

As shown in FIG. 10, a pipe 24 is provided at one end thereof with a pipe sleeve portion 24a which has the same construction as those of the embodiments described above. The pipe 24 is bent substantially at right angles with respect to the pipe sleeve portion 24a. A fastening clip 25 is fastened to the pipe 24 by a fastening portion 25a at a predetermined distance from the pipe sleeve portion 24a. In operation, the pipe sleeve portion 24a of the pipe 24 is inserted in a connecting hole 7a of a mating part (not illustrated) and pawls 25b of the fastening clip 24 are engaged with the fixing holes 7b of the mating part 7. Further, the pipe 24 is also provided with a hose connecting portion 24c (see FIGS. 2A to 2D) at the other end thereof. In order to insure good sealing performance between the pipe sleeve portion 24a and the connecting hole 7a, an O-ring (not shown) is fitted on the pipe sleeve portion 24a.

The operation of positionally fixing the pipe 24 to the mating part is substantially identical to the sixth and seventh embodiments described above, so a detailed explanation thereof will be omitted in the present embodiment. Generally, however, the pipe sleeve portion 24a is assuredly connected to the connecting hole 7a by engaging the pawls 25b of the fastening clip 25 in the fixing holes 7b of the mating part when the pipe sleeve portion 24a of the pipe 24 is concurrently inserted in the connecting hole 7a of the mating part. Accordingly, it is possible to prevent the pipe sleeve portion 24a from moving in the vertical and horizontal directions by using clip 25 or the like. For this reason, special parts such as the stopper plate 9 of the prior art become unnecessary.

As described above, the hose coupling device according to the present embodiment consists of a pipe 24 and a fastening clip 25 which is fastened to the pipe 24 by a fastening portion 25a in the vicinity of the pipe sleeve portion 24a and which is capable of positioning and fixing the pipe sleeve portion 24a in the vertical and horizontal directions with respect to the connecting hole 7a of the mating part 7.

Again, since the construction of the hose coupling device is greatly simplified so that it is possible to perform the positioning and fixing against the movement thereof without using the stopper plate or the like, the number of the component parts is decreased, manufacturing and attaching operations are simplified, and the cost of the device is reduced.

Figure 11:
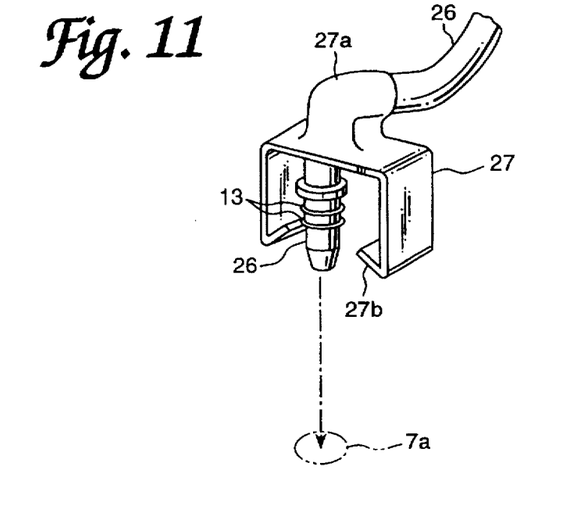
FIG. 11 is a perspective view of a hose coupling device according to a ninth embodiment of the present invention.

FIG. 11 is a perspective view illustrating a hose coupling device according to a ninth embodiment of the present invention. FIGS. 2A to 2D are common to the embodiments described above. In the drawings, the same reference numerals and characters denote the same or corresponding component parts as those of the prior art and the embodiments described above.

As shown in FIG. 11, a pipe 26 is provided at one end thereof with a pipe sleeve portion 26a having the same construction as the embodiments described above. The pipe 26 is bent substantially at right angles with respect to the pipe sleeve portions 26a. A fastening clip 27 is fastened to the bent portion by a fastening portion 27a. The pipe sleeve portion 26a of the pipe 26 is inserted in a connecting hole 7a of a mating part. Pawls 27b of the fastening clip 27, which are located substantially on a level with the pipe sleeve portion 26a of the pipe 26, are engaged with engaging portions (not shown) of the mating part. Further, the pipe 26 is provided at the other end thereof with a hose connecting portion 26c (see FIGS. 2A to 2D). Incidentally, in order to insure good sealing performance between the pipe sleeve portion 26a and the connecting hole 7a, two O-rings 13 are fitted on the pipe sleeve portion 26a. Only one O-ring 13 may be used if deemed appropriate.

The procedure for processing the pipe 26 of the hose coupling device according to this embodiment and the operation of fixing the pipe 26 to the mating part are substantially the same as those of the embodiments described above. Namely, the pipe 26 can be fixed to the mating part by inserting the pipe sleeve portion 26a with O-rings 13 in a connecting hole 7a and then engaging the pawls 27b of the fastening clip 27 with engaging portions of the mating part, so that the pipe sleeve portion 26a can be assuredly connected to the connecting hole 7a. Accordingly, a complicated positioning operation is unnecessary and it is therefor possible to prevent the pipe sleeve portion 26a from moving in the vertical and horizontal directions by using the fastening clip 27. For this reason, special parts such as the stopper plate 9 of the prior art are unnecessary.

The hose coupling device according to this embodiment consists of a pipe 26, which is provided with the pipe sleeve portion 26a at one end thereof and with a hose connecting portion 26c at the other end thereof, and a fastening clip 27 which is fastened to the pipe 26 by a fastening portion 27a near the pipe sleeve portion 26a and which is capable of positioning and fixing the pipe sleeve portion 26a in the vertical and horizontal directions thereof with respect to the connecting hole 7a of the mating part 7.

Again, in the present embodiment, the number of the component parts is decreased, manufacturing and attaching operations are simplified, and the cost of the device is reduced, similar to the other previously described embodiments.

Besides the embodiments described above, it is possible to form a suitable fastening clip by winding a linear or sheet material such as a wire, piano wire or shape effect alloy which can maintain the configuration around the pipe.

According to the hose coupling device according to the present invention, a pipe sleeve portion provided at one end of a pipe is positioned and fixed in the vertical and horizontal directions thereof with respect to a connecting hole of a mating part by means of a positional fixing part fastened to the pipe near the pipe sleeve portion. Therefore, the number of the component parts in the device is decreased to reduce overall expenses. Further, it is possible to easily perform the positioning and fixing against the movement, so that the manufacturing and attaching operations thereof are simplified and the cost of the device is again reduced.

What is claimed is:

1. A pipe coupling device comprising:
a pipe providing an extension of a hose, a mating part having a pipe connecting hole, said pipe having a sleeve portion formed at one end thereof for insertion in said pipe connecting hole, a bent portion provided in said pipe adjacent to said sleeve portion, and fixing means spaced from said sleeve portion to positionally fix said sleeve portion to said mating part,
wherein said bent portion comprises an annular coiled portion formed at a predetermined distance from said sleeve portion.

2. A hose coupling device according to claim 1, wherein said bent portion further includes a corrugated bent portion in said pipe.

3. A hose coupling device according to claim 1, wherein the bent portion comprises an overlapped folded portion of said pipe.

4. A hose coupling device according to claim 1, wherein the bent portion comprises an annular double coiled portion of said pipe.

5. A hose coupling device as in claim 4 wherein said fixing means includes a clip inserted through said annular double coiled portion for fastening to said mating part.

6. A hose coupling device according to claim 1, wherein the bent portion comprises a spiral roundabout portion of said pipe.

7. A hose coupling device as in claim 6 wherein said fixing means includes a forked clip for securing said roundabout portion to said mating part.

* * * * *